US011929002B2

(12) United States Patent
Moon et al.

(10) Patent No.: US 11,929,002 B2
(45) Date of Patent: Mar. 12, 2024

(54) METHOD OF CALCULATING RESPECTIVE GAMMA VALUES FOR DISPLAY AREAS OF A DISPLAY PANEL

(71) Applicant: SAMSUNG DISPLAY CO., LTD., Yongin-si (KR)

(72) Inventors: Dongwon Moon, Seoul (KR); Sungyoon Jo, Incheon (KR); Naoaki Komiya, Hwaseong-si (KR); Sang-Gon Lee, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/177,700

(22) Filed: Feb. 17, 2021

(65) Prior Publication Data

US 2021/0256893 A1 Aug. 19, 2021

(30) Foreign Application Priority Data

Feb. 17, 2020 (KR) ........................ 10-2020-0019255

(51) Int. Cl.
*G09G 3/20* (2006.01)
*G09G 3/00* (2006.01)
*G09G 3/3208* (2016.01)

(52) U.S. Cl.
CPC ........... *G09G 3/2003* (2013.01); *G09G 3/006* (2013.01); *G09G 3/3208* (2013.01); (Continued)

(58) Field of Classification Search
None
See application file for complete search history.

(56) References Cited

U.S. PATENT DOCUMENTS

2003/0142374 A1* 7/2003 Silverstein ............. H04N 17/04 348/E17.005
2009/0135211 A1 5/2009 Wang et al.
(Continued)

FOREIGN PATENT DOCUMENTS

KR 10-2015-0048394 5/2015
KR 10-2016-0070911 6/2016
KR 10-1954934 2/2019

*Primary Examiner* — Benjamin C Lee
*Assistant Examiner* — Emily J Frank
(74) *Attorney, Agent, or Firm* — F. CHAU & ASSOCIATES, LLC

(57) ABSTRACT

A method of calculating a gamma-value for a display panel includes displaying a first color test image having a first target gray-level and then measuring a first luminance-value implemented by at least one first color-pixel included in a $j^{th}$ display-area, displaying a second color test image having the first target gray-level and then measuring a second luminance-value implemented by at least one second color-pixel included in the $j^{th}$ display-area, deriving an estimated driving current flowing in the second color-pixel at the first target gray-level based on RGB gray level-driving current curves, deriving a second target gray-level when the estimated driving current flows in the first color-pixel based on the RGB gray level-driving current curves, and calculating a target gamma-value to be applied to the first color-pixel included in the $j^{th}$ display-area based on the first target gray-level, the second target gray-level, the first luminance-value, and the second luminance-value.

18 Claims, 6 Drawing Sheets

(52) U.S. Cl.
CPC ............... *G09G 2300/0452* (2013.01); *G09G 2320/0626* (2013.01); *G09G 2320/0673* (2013.01); *G09G 2360/147* (2013.01)

(56) References Cited

U.S. PATENT DOCUMENTS

| | | | | |
|---|---|---|---|---|
| 2013/0141409 | A1* | 6/2013 | Kosei | G09G 3/006<br>345/207 |
| 2013/0201166 | A1* | 8/2013 | Wang | G09G 3/3637<br>345/204 |
| 2017/0206825 | A1* | 7/2017 | Cha | G09G 3/3208 |
| 2018/0261184 | A1* | 9/2018 | Ninan | H04N 5/202 |
| 2019/0122607 | A1* | 4/2019 | Yan | G09G 3/20 |
| 2019/0251916 | A1* | 8/2019 | Wu | G09G 3/2003 |
| 2020/0126499 | A1* | 4/2020 | Huang | G09G 3/3607 |
| 2020/0160801 | A1* | 5/2020 | Wang | G09G 3/36 |
| 2020/0279519 | A1* | 9/2020 | Orio | G09G 3/2011 |
| 2022/0215782 | A1* | 7/2022 | Huang | G09G 3/002 |

* cited by examiner

METHOD OF CALCULATING RESPECTIVE GAMMA VALUES FOR DISPLAY AREAS OF A DISPLAY PANEL

CROSS-REFERENCE TO RELATED APPLICATION

This application claims priority under 35 USC § 119 to Korean Patent Application No. 10-2020-0019255 filed on Feb. 17, 2020 in the Korean Intellectual Property Office (KIPO), the entire disclosure of which is herein incorporated by reference.

BACKGROUND

1. Field

The present inventive concept relates to an organic light emitting diode display device, more particularly, to a method of calculating RGB gamma values to be applied to a plurality of display areas of a display panel having an organic light emitting diode display device.

2. Description of the Related Art

Recently, organic light emitting diode display devices are widely used as display devices for electronic devices. In general, pixels included in a display panel of the organic light emitting diode display device have characteristic variations due to various causes in a manufacturing process, so that display panels manufactured in the same process may also have characteristic variations. Even when the same data is applied to the display panels that are manufactured in the same process, images displayed on the display panels may have mutually different color coordinates or luminances. When an organic light emitting diode display device is manufactured, a process of displaying a test image on the display panel, measuring luminance values implemented by display areas (or pixels) of the display panel by using a luminance measurement device, analyzing the luminance values to generate a display area-specific compensation parameter, and storing the display area-specific compensation parameter in a predetermined memory device within the organic light emitting diode display device may be performed. Accordingly, the organic light emitting diode display device may perform luminance compensation on input image data based on the display area-specific compensation parameter to generate output image data. However, while generating the display area-specific compensation parameter, when the same RGB gamma value is applied to all display areas of the display panel, there is a problem that the display areas have a large luminance deviation in a low gray-level image, whereas the display areas have a luminance deviation that is not large in a high gray-level image. Therefore, RGB gamma values are set to be different from each other for each display area of the display panel (e.g., RGB gamma values to be assigned to a low gray level are set to be different from each other for each display area of the display panel, and RGB gamma values to be assigned to a high gray level are set to be the same for all the display areas of the display panel). However, in order to set the RGB gamma values to be different from each other for each display area of the display panel, it is necessary to capture at least two test images having mutually different gray levels for each color (i.e., RGB), so that the manufacturing process of the organic light emitting diode display device may become longer.

SUMMARY

Some embodiments provide a method of calculating a gamma value for a display panel, where the method is capable of calculating first to $k^{th}$ RGB gamma values to be applied to first to $k^{th}$ display areas of the display panel even when only one test image is captured for each color (i.e., RGB) while setting RGB gamma values to be different from each other for each display area of the display panel included in an organic light emitting diode display device.

According to an embodiment of the present inventive concept, a method of calculating a gamma value for a display panel having first to $k^{th}$ display areas, wherein the method calculates first to $k^{th}$ RGB gamma values, where k is an integer greater than or equal to 2, to be applied to the first to $k^{th}$ display areas, includes displaying a first color test image having a first target gray level on the display panel, and then measuring a first luminance value of a first light emitted from a first color pixel included in a $j^{th}$ display area, where j is an integer between 1 and k, by using a luminance measurement device, displaying a second color test image having the first target gray level on the display panel, and then measuring a second luminance value of a second light emitted from a second color pixel included in the $j^{th}$ display area by using the luminance measurement device, obtaining an estimated driving current flowing the second color pixel at the first target gray level from a second color gray level-driving current curve of RGB gray level-driving current curves, the RGB gray level-driving current curves including a first color gray level-driving current curve which maps a gray level of the first color pixel to an estimated driving current flowing the first color pixel, and the second color gray level-driving current curve which maps a gray level of the second color pixel to an estimated driving current flowing the second color pixel, obtaining a second target gray level of the first color pixel at the estimated driving current of the second color pixel from the first color gray level-driving current curve of the RGB gray level-driving current curves, and calculating a target gamma value to be applied to the first color pixel included in the $j^{th}$ display area based on the first target gray level, the second target gray level, the first luminance value, and the second luminance value.

In embodiments, the RGB gray level-driving current curves may be predetermined during a design stage of the display panel according to characteristics of a driving transistor and an organic light emitting diode that are to be formed in the first color pixel and the second color pixel.

In embodiments, the first color pixel may be a red pixel, and the second color pixel may be a green pixel or a blue pixel.

In embodiments, the first color pixel may be a green pixel, and the second color pixel may be a red pixel or a blue pixel.

In embodiments, the first color pixel may be a blue pixel, and the second color pixel may be a red pixel or a green pixel.

In embodiments, the method may further include allocating the target gamma value to a low gray-level region having a gray level which is less than or equal to the first target gray level, and allocating a reference gamma value of the display panel to a high gray-level region having a gray level which is greater than the first target gray level.

In embodiments, the reference gamma value may be 2.2.

In embodiments, the RGB gray level-driving current curves further include a third color gray level-driving current curve which maps a gray level of a third color pixel in the $j^{th}$ display area to an estimated driving current flowing the third color pixel.

In embodiments, the first color pixel is one of a plurality of first pixels which are included in the $j^{th}$ display area and are the same kind pixel as the first color pixel. The second color pixel is one of a plurality of second pixels which are included in the $j^{th}$ display area and are the same kind pixel as the second color pixel. The first luminance value is an arithmetic average luminance value of the plurality of first pixels included in the $j^{th}$ display area. The second luminance value is an arithmetic average luminance value of the plurality of second pixels included in the $j^{th}$ display area.

In embodiments, the first color pixel is one of a plurality of first pixels which are included in the $j^{th}$ display area and are the same kind pixel as the first color pixel. The second color pixel is one of a plurality of second pixels which are included in the $j^{th}$ display area and are the same kind pixel as the second color pixel. The first luminance value is a weighted average luminance value of the plurality of first pixels included in the $j^{th}$ display area. The second luminance value is a weighted average luminance value of the plurality of second pixels included in the $j^{th}$ display area.

In embodiments, the first color pixel is one of a plurality of first pixels which are included in the $j^{th}$ display area and are the same kind pixel as the first color pixel. The second color pixel is one of a plurality of second pixels which are included in the $j^{th}$ display area and are the same kind pixel as the second color pixel. The first luminance value is a luminance value of one of the plurality of first pixels included in the $j^{th}$ display area. The second luminance value is a luminance value of one of the plurality of second pixels included in the $j^{th}$ display area.

In embodiments, the $j^{th}$ display area may include one unit pixel including at least one red pixel, at least one green pixel, and at least one blue pixel.

In embodiments, the $j^{th}$ display area may include a plurality of unit pixels each including at least one red pixel, at least one green pixel, and at least one blue pixel.

In embodiments, the target gamma value may be calculated independently from a reference display area gamma value that is set to a reference display area.

In embodiments, the target gamma value may be calculated by Formula 1:

$$TGV(\gamma) = \frac{\log(SLV) - \log(FLV)}{\log(STG) - \log(FTG)},$$

where TGV denotes the target gamma value, FLV denotes the first luminance value, SLV denotes the second luminance value, FTG denotes the first target gray level, and STG denotes the second target gray level.

In embodiments, the target gamma value may be calculated by reflecting a reference display area gamma value that is set to a reference display area.

In embodiments, the target gamma value may be calculated by the following formula:

$$TGV(\gamma) = \frac{\log(C \times SLV) - \log(FLV)}{\log(STG) - \log(FTG)},$$

where TGV(γ) denotes the target gamma value, FLV denotes the first luminance value, SLV denotes the second luminance value, FTG denotes the first target gray level, STG denotes the second target gray level, and C denotes a constant for reflecting the reference display area gamma value.

In embodiments, the reference display area may be a center display area of the display panel among the first to kth display areas.

In embodiments, the reference display area gamma value may be a reference gamma value of the display panel.

In embodiments, the reference display area gamma value may be 2.2.

Therefore, a method of calculating a gamma value for a display panel according to embodiments, when calculating first to $k^{th}$ RGB gamma values, where k is an integer greater than or equal to 2, to be applied to first to $k^{th}$ display areas of the display panel, may display a first color test image having a first target gray level on the display panel and then measure a first luminance value implemented by at least one first color pixel included in a $j^{th}$ display area, where j is an integer between 1 and k, by using a luminance measurement device, may display a second color test image having the first target gray level on the display panel and then measure a second luminance value implemented by at least one second color pixel included in the $j^{th}$ display area by using the luminance measurement device, may derive an estimated driving current flowing in the second color pixel at the first target gray level based on RGB gray level-driving current curves, may derive a second target gray level when the estimated driving current flows in the first color pixel based on the RGB gray level-driving current curves, and may calculate a target gamma value to be applied to the first color pixel included in the $j^{th}$ display area based on the first target gray level, the second target gray level, the first luminance value implemented at the first target gray level by the at least one first color pixel included in the $j^{th}$ display area, and the second luminance value implemented at the first target gray level by the at least one second color pixel included in the $j^{th}$ display area, so that the first to $k^{th}$ RGB gamma values to be applied to the first to $k^{th}$ display areas of the display panel may be calculated by using the RGB gray level-driving current curves even when only one test image is captured for each color (i.e., RGB). Accordingly, the method may solve a conventional problem that a manufacturing process of the organic light emitting diode display device becomes longer in order to set the RGB gamma values to be different from each other for each display area of the display panel, so that the method may be easily applied to mass production of the organic light emitting diode display device.

BRIEF DESCRIPTION OF THE DRAWINGS

Illustrative, non-limiting embodiments will be more clearly understood from the following detailed description in conjunction with the accompanying drawings.

DETAILED DESCRIPTION OF THE EMBODIMENTS

Hereinafter, embodiments of the present inventive concept will be explained in detail with reference to the accompanying drawings.

Figure 1:
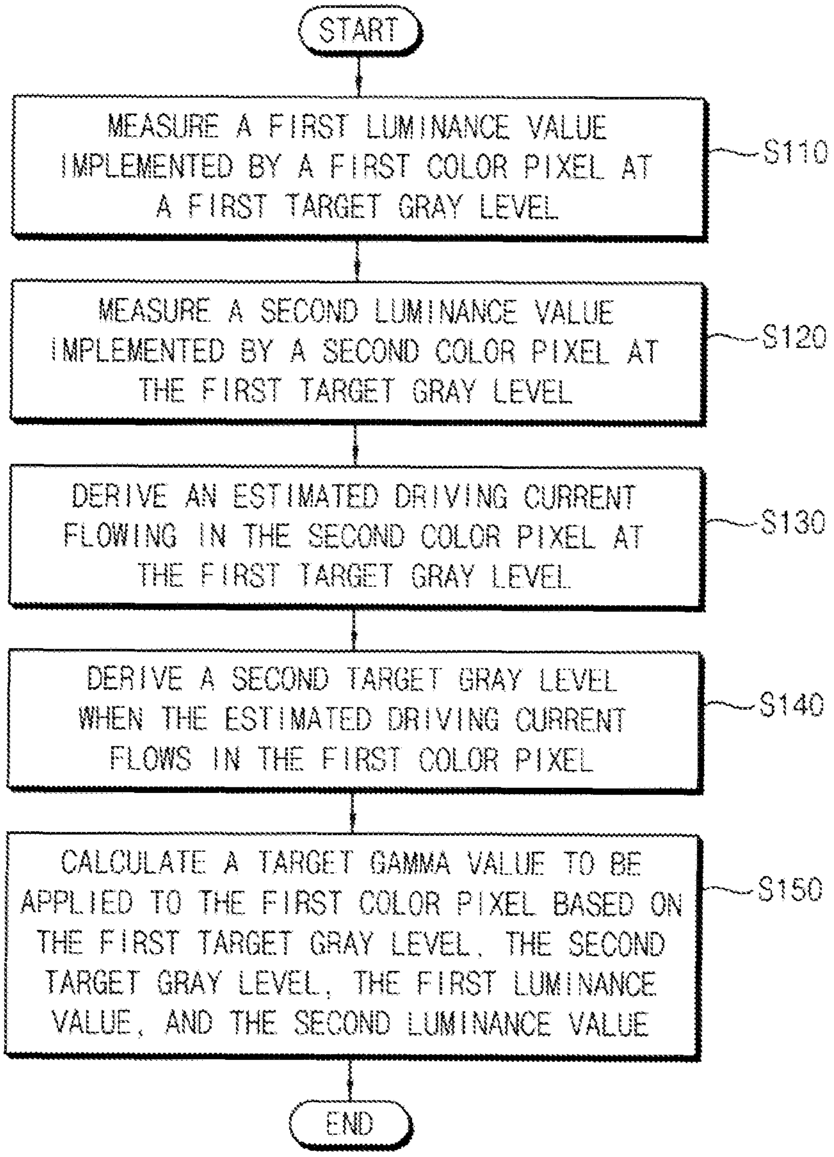
FIG. 1 is a flowchart illustrating a method of calculating a gamma value for a display panel according to an embodiment of the present inventive concept.
Figure 2:
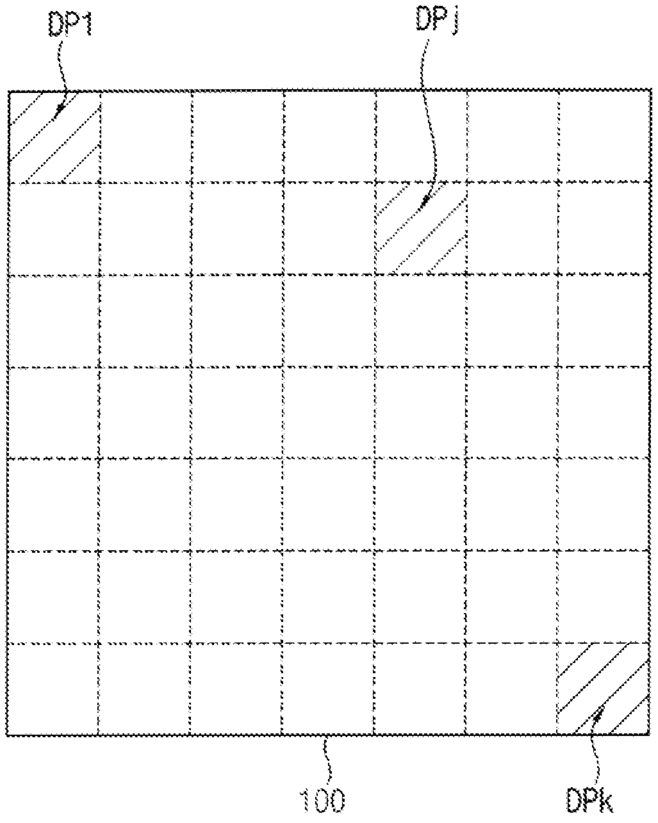
FIG. 2 is a diagram illustrating an example of a display panel to which the method of FIG. 1 is applied according to an embodiment of the present inventive concept.
Figure 3:
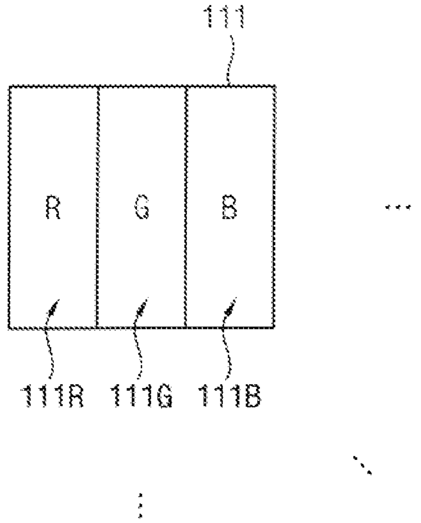
FIG. 3 is a diagram illustrating an example of a unit pixel included in a display panel to which the method of FIG. 1 is applied according to an embodiment of the present inventive concept.
Figure 4:
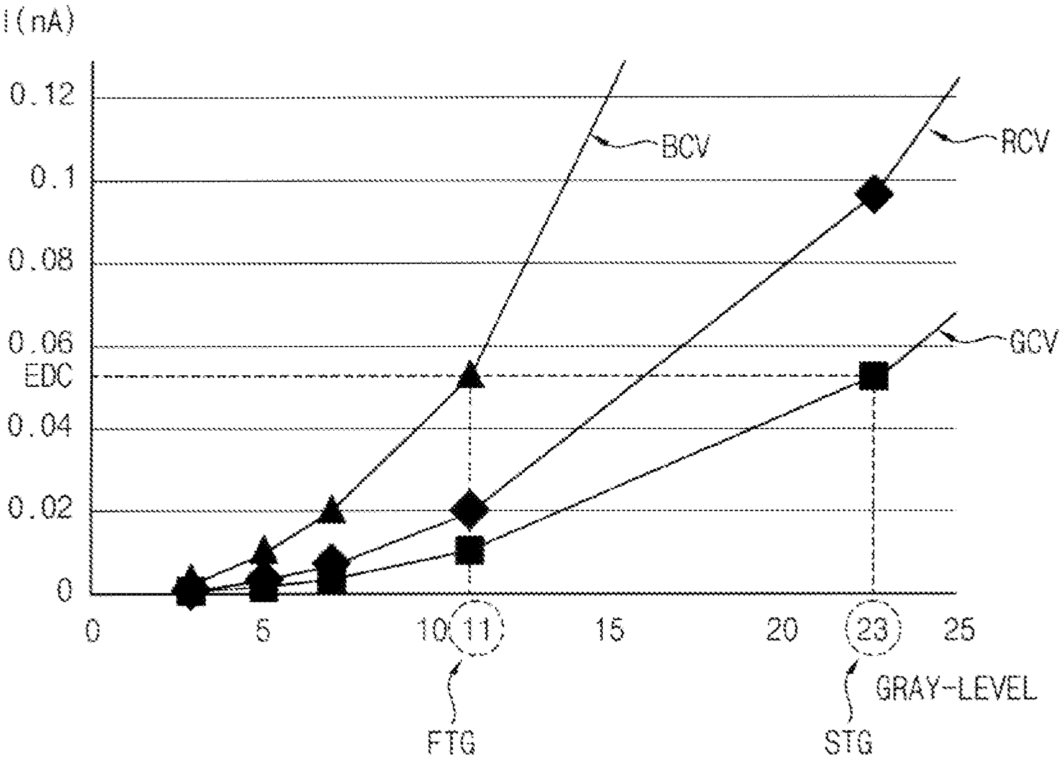
FIG. 4 is a diagram illustrating an example of RGB gray level-driving current curves used in the method of FIG. 1 according to an embodiment of the present inventive concept.

FIG. 1 is a flowchart illustrating a method of calculating a gamma value for a display panel according to an embodiment, FIG. 2 is a diagram illustrating an example of a display panel to which the method of FIG. 1 is applied, FIG. 3 is a diagram illustrating an example of a unit pixel included in a display panel to which the method of FIG. 1 is applied, and FIG. 4 is a diagram illustrating an example of RGB gray level-driving current curves used in the method of FIG. 1.

Referring to FIGS. 1 to 4, a method of calculating a gamma value of FIG. 1 may calculate first to $k^{th}$ RGB gamma values, where k is an integer greater than or equal to 2, to be applied to first to $k^{th}$ display areas DP1, . . . , and DPk of a display panel 100. The method of FIG. 1 may calculate the first RGB gamma value (i.e., a first red gamma value, a first green gamma value, and a first blue gamma value) to be applied to the first display area DP1, calculate the second RGB gamma value (i.e., a second red gamma value, a second green gamma value, and a second blue gamma value) to be applied to the second display area DP2, calculate the $(k-1)^{th}$ RGB gamma value (i.e., a $(k-1)^{th}$ red gamma value, a $(k-1)^{th}$ green gamma value, and a $(k-1)^{th}$ blue gamma value) to be applied to the $(k-1)^{h}$ display area DPk−1, and calculate the $k^{th}$ RGB gamma value (i.e., a $k^{th}$ red gamma value, a $k^{th}$ green gamma value, and a $k^{th}$ blue gamma value) to be applied to the $k^{th}$ display area DPk. The "RGB gamma value to be applied to a display area" means that a source driver coupled to the display area may generate a voltage according to an RGB gamma value. In an embodiment, the source driver is a gray-level voltage generator. As shown in FIG. 2, the display panel 100 may include first to $k^{th}$ display areas DP1, . . . , and DPk, and the method of FIG. 1 may be applied to all the first to $k^{th}$ display areas DP, . . . , and DPk. However, for convenience of description, in the present disclosure, the method of FIG. 1 will be described with reference to a $j^{th}$ display area DPj.

The method of FIG. 1 may display a first color test image having a first target gray level FTG, which corresponds to a gray level which determines whether a display area is a low gray-level region or a high gray-level region, on the display panel 100 and then measure a first luminance value implemented by at least one first color pixel included in a $j^{th}$ display area DPj, where j is an integer between 1 and k, by using a luminance measurement device (e.g., a camera device) (S110), and may display a second color test image having the first target gray level FTG on the display panel 100 and then measure a second luminance value implemented by at least one second color pixel included in the $j^{th}$ display area DPj by using the luminance measurement device (S120). In an example embodiment, in step S110 of the method of FIG. 1, the display panel 100 is operated to display the first color test image having the first target gray level FTG, and then the first luminance value of a light emitted, according to the first target gray level FTG, from at least one first color pixel of the $j^{th}$ display area DPj, and in step S120 of the method of FIG. 1, the display panel 100 is operated to display the second color test image having the first target gray level FTG, and then the second luminance value of a light emitted, according to the first target gray level FTG, from at least one second color pixel of the $j^{th}$ display area DPj. For example, the first color pixel may be a red pixel 111R, and the second color pixel may be a green pixel 111G or a blue pixel 111B. As another example, the first color pixel may be a green pixel 111G, and the second color pixel may be a red pixel 111R or a blue pixel 111B. As still another example, the first color pixel may be a blue pixel 111B, and the second color pixel may be a red pixel 111R or a green pixel 111G. In an embodiment, the first luminance value of alight emitted by at least one first color pixel which is included in (i.e., which is provided with) the $j^{th}$ display area DPj may be an arithmetic average luminance value of the at least one first color pixel of the $j^{th}$ display area DPj, and the second luminance value of a light emitted by at least one second color pixel which is included in the $j^{th}$ display area DPj may be an arithmetic average luminance value of the at least one second color pixel of the $j^{th}$ display area DPj. In another embodiment, the first luminance value of a light emitted from at least one first color pixel which is included in the $j^{th}$ display area DPj may be a weighted average luminance value of the at least one first color pixel of the $j^{th}$ display area DPj (e.g., the average luminance value is calculated by giving more weight to a luminance value of a specific pixel and giving less weight to a luminance value of another specific pixel), and the second luminance value of a light emitted from at least one second color pixel which is included in the $j^{th}$ display area DPj may be a weighted average luminance value of the at least one second color pixel of the $j^{th}$ display area DPj. In still another embodiment, the first luminance value of a light emitted from at least one first color pixel which is included in the $j^{th}$ display area DPj may be a luminance value of one of the at least one first color pixel of the $j^{th}$ display area DPj (e.g., obtained by calculating a luminance value of a representative pixel), and the second luminance value of a light emitted from at least one second color pixel which is included in the $j^{th}$ display area DPj may be a luminance value of one of the at least one second color pixel of the $j^{th}$ display area DPj.

As shown in FIG. 2, the display panel 100 may include the first to $k^{th}$ display areas DP1, . . . , and DPk, and each of the first to k display areas DP1, . . . , and DPk may include at least one unit pixel 111. In an embodiment, each of the first to $k^{th}$ display areas DP1, . . . , and DPk (i.e., the $j^{th}$ display area DPj) may include one unit pixel 111 including at least one red pixel 111R, at least one green pixel 111G, and at least one blue pixel 111B. In another embodiment, each of the first to $k^{th}$ display areas DP1, . . . , and DPk (i.e., the $j^{th}$ display area DPj) may include a plurality of unit pixels 111, in which each of the unit pixels 111 includes at least one red pixel 111R, at least one green pixel 111G, and at least one blue pixel 111B. For example, as shown in FIG. 3, the unit pixel 111 may have an RGB stripe structure. As another example, the unit pixel 111 may have a pentile structure. Since the red pixel 111R, the green pixel 111G, and the blue pixel 111B included in each of the first to $k^{th}$ display areas DP1, . . . , and DPk are adjacent to each other, transistors (e.g., driving transistors) constituting the pixels may have similar operating characteristics. When driving transistors in the pixels have the same driving current, the pixels have similar luminance characteristics according to an input voltage. For example, the red pixel 111R, the green pixel 111G, and the blue pixel 111B included in each of the first to $k^{th}$ display areas DP1, . . . , and DPk (i.e., adjacent to each other) may have similar luminance characteristics according to the input voltage. Therefore, the method of FIG. 1 may calculate the first to $k^{th}$ RGB gamma values to be applied to the first to $k^{th}$ display areas DP1, . . . , and DPk by taking into consideration that the red pixel 111R, the green pixel 111G, and the blue pixel 111B included in each of the first to $k^{th}$ display areas DP1, . . . , and DPk have similar luminance characteristics according to the input voltage.

The method of FIG. 1 may derive an estimated driving current EDC flowing the second color pixel at the first target gray level FTG based on RGB gray level-driving current curves RCV, GCV, and BCV (S130), and may derive a second target gray level STG when the estimated driving current EDC flows in the first color pixel based on the RGB gray level-driving current curves RCV, GCV, and BCV (S140). The RGB gray level-driving current curves RCV, GCV, and BCV may be predetermined during a design stage of the display panel 100 according to characteristics of a driving transistor and characteristics of an organic light emitting diode that are designed to be included in the first color pixel and the second color pixel. For example, FIG. 4 shows the derivation of the second target gray level STG, which is 23 gray levels, when the first color pixel is the green pixel 111G, the second color pixel is the blue pixel 111B, and the first target gray level FTG is 11 gray levels. When the estimated driving current EDC flowing the blue pixel 111B at the first target gray level FTG of 11 gray levels is derived based on a blue gray level-driving current curve BCV, the second target gray level STG when the estimated driving current EDC flows in the green pixel may be derived as 23 gray levels based on a green gray level-driving current curve GCV. In an embodiment, the green gray level-driving current curve GCV may map a gray level of the green pixel 111G to an estimated driving current flowing the green pixel 111G.

In an embodiment, the blue gray level-driving current curve BCV may map a gray level of the blue pixel 111B to an estimated driving current flowing the blue pixel 111B. The RGB gray level-driving current curves RCV, GCV, and BCV may further include a red gray level-driving current curve RCV which maps a gray level of the red pixel 111R to an estimated driving current flowing the red pixel 111R. The $j^{th}$ display area DPj may include the red pixel 111R, the green pixel 111G, and the blue pixel 111B which have similar luminance characteristics according to the input voltage. A luminance value (i.e., an estimated luminance value) of the at least one first color pixel included in the $j^{th}$ display area DPj at the second target gray level STG may be substantially the same as the second luminance value (i.e., the measured luminance value) of the at least one second color pixel included in the $j^{th}$ display area DPj at the first target gray level FTG. As a result, the method of FIG. 1 may recognize the first target gray level FTG, the second target gray level STG, the first luminance value implemented at the first target gray level FTG by the at least one first color pixel included in the $j^{th}$ display area DPj, and the second luminance value implemented at the first target gray level FTG by the at least one second color pixel included in the $j^{th}$ display area DPj (i.e., a luminance value implemented by the at least one first color pixel included in the $j^{th}$ display area DPj at the second target gray level STG).

Next, the method of FIG. 1 may calculate a target gamma value to be applied to the first color pixel included in the $j^{th}$ display area DPj based on the first target gray level FTG, the second target gray level STG, the first luminance value implemented at the first target gray level FTG by the at least one first color pixel included in the $j^{th}$ display area DPj, and the second luminance value implemented at the first target gray level FTG by the at least one second color pixel included in the $j^{th}$ display area DPj (S150). The first luminance value and the second luminance value may be measured in steps S110 and S120, and the second target gray level STG may be obtained in step S140 using the RGB gray level-driving current curves RCV, GCV, and BCV. In an embodiment, the target gamma value to be applied to the first color pixel included in the $j^{th}$ display area DPj may be calculated independently from (or irrespective of) a reference display area gamma value that is set to a reference display area. The reference display area may be a center display area of the display panel 100 among the first to $k^{th}$ display areas DP1, . . . , and DPk. For example, the reference display area gamma value that is set to the reference display area (e.g., the center display area) may be a reference gamma value of the display panel 100, and the reference gamma value of the display panel 100 may be 2.2. The reference display area gamma value that is set to the reference display area (e.g., the center display area) may be 2.2. The target gamma value to be applied to the first color pixel included in the $j^{th}$ display area DPj may be calculated without considering the reference display area gamma value that is set to the reference display area (e.g., the center display area). The target gamma value to be applied to the first color pixel included in the $j^{th}$ display area DPj may be calculated by Formula 1 as follows.

$$TGV(\gamma) = \frac{\log(SLV) - \log(FLV)}{\log(STG) - \log(FTG)},$$

where TGV denotes the target gamma value to be applied to the first color pixel included in the $j^{th}$ display area DPj, FLV denotes the first luminance value implemented at the first target gray level FTG by the first color pixel included in the $j^{th}$ display area DPj, SLV denotes the second luminance value implemented at the first target gray level FTG by the second color pixel included in the $j^{th}$ display area DPj, FTG denotes the first target gray level, and STG denotes the second target gray level.

In another embodiment, the target gamma value to be applied to the first color pixel included in the $j^{th}$ display area DPj may be calculated by reflecting a reference display area gamma value that is set to a reference display area. The reference display area may be a center display area of the display panel 100 among the first to $k^{th}$ display areas DP1, . . . , and DPk. For example, the reference display area gamma value that is set to the reference display area (e.g., the center display area) may be a reference gamma value of the display panel 100, and the reference gamma value of the display panel 100 may be 2.2. The reference display area gamma value that is set to the reference display area (e.g., the center display area) may be 2.2. The target gamma value to be applied to the first color pixel included in the $j^{th}$ display area DPj may be calculated using the reference display area gamma value that is set to the reference display area (e.g., the center display area). For example, the target gamma value to be applied to the first color pixel included in the $j^{th}$ display area DPj may be calculated by [Formula 2] as follows. For example, when the reference display area gamma value that is set to the reference display area (e.g., the center display area) is 2.2 (i.e., 2.2 is substituted for TGV), since the first luminance value (i.e., FLV) implemented at the first target gray level FTG by the first color pixel included in the $j^{th}$ display area DPj, the second luminance value (i.e., SLV) implemented at the first target gray level FTG by the second color pixel included in the $j^{th}$ display area DPj, the first target gray level (i.e., FTG), and the second target gray level (i.e., STG) have been recognized, a constant C for reflecting the reference display area gamma value may be obtained. Accordingly, when the target gamma value to be applied to the first color pixel included in the $j^{th}$ display area DPj is calculated by Formula 2 as follows, the reference display area gamma value that is set to the reference display area (e.g., the center display area) may be reflected (i.e., the constant C for reflecting the reference display area gamma value exists in the following [Formula 2]).

[Formula 2]

$$TGV(\gamma) = \frac{\log(C \times SLV) - \log(FLV)}{\log(STG) - \log(FTG)},$$

where TGV denotes the target gamma value to be applied to the first color pixel included in the $j^{th}$ display area DPj, FLV denotes the first luminance value implemented at the first target gray level FTG by the first color pixel included in the $j^{th}$ display area DPj, SLV denotes the second luminance value implemented at the first target gray level FTG by the second color pixel included in the $j^{th}$ display area DPj, FTG denotes the first target gray level, STG denotes the second target gray level, and C denotes the constant for reflecting the reference display area gamma value that is set to the reference display area.

Although the pixels have been described above as being classified into the first color pixel and the second color pixel included in the $j^{th}$ display area DPj, and only the target gamma value to be applied to the first color pixel included in the $j^{th}$ display area DPj has been described above as being calculated, the above descriptions are given only for describing that the target gamma value to be applied to the first color pixel included in the $j^{th}$ display area DPj may be calculated by using the first luminance value implemented by the first color pixel included in the $j^{th}$ display area DPj, the second luminance value implemented by the second color pixel included in the $j^{th}$ display area DPj, and the RGB gray level-driving current curves RCV, GCV, and BCV, and it is to be understood that the method of FIG. 1 may calculate all $j^{th}$ RGB gamma values to be applied to the red pixel 111R, the green pixel 111G, and the blue pixel 111B included in the $j^{th}$ display area DPj. The method of FIG. 1 may calculate a target gamma value to be applied to the red pixel 111R included in the $j^{th}$ display area DPj (i.e., a $j^{th}$ red gamma value) by using a first luminance value implemented at the first target gray level FTG by the red pixel 111R included in the $j^{th}$ display area DPj, a second luminance value implemented at the first target gray level FTG by the green pixel 111G or the blue pixel 111B included in the $j^{th}$ display area DPj, and the RGB gray level-driving current curves (i.e., by deriving the second target gray level STG), may calculate a target gamma value to be applied to the green pixel 111G included in the $j^{th}$ display area DPj (i.e., a $j^{th}$ green gamma value) by using a first luminance value implemented at the first target gray level FTG by the green pixel 111G included in the $j^{th}$ display area DPj, a second luminance value implemented at the first target gray level FTG by the red pixel 111R or the blue pixel 11B included in the $j^{th}$ display area DPj, and the RGB gray level-driving current curves (i.e., by deriving the second target gray level STG), and may calculate a target gamma value to be applied to the blue pixel 111B included in the $j^{th}$ display area DPj (i.e., a $j^{th}$ blue gamma value) by using a first luminance value implemented at the first target gray level FTG by the blue pixel 111B included in the $j^{th}$ display area DPj, a second luminance value implemented at the first target gray level FTG by the red pixel 111R or the green pixel 111G included in the $j^{th}$ display area DPj, and the RGB gray level-driving current curves (i.e., by deriving the second target gray level STG).

Conventionally, at least two test images having mutually different gray levels for each color (i.e., RGB) are captured in order to set the first to $k^{th}$ RGB gamma values to be applied to the first to $k^{th}$ display areas DP1, . . . , and DPk (e.g., a red test image having the first target gray level FTG and a red test image having the second target gray level STG are captured, a green test image having the first target gray level FTG and a green test image having the second target gray level STG are captured, and a blue test image having the first target gray level FTG and a blue test image having the second target gray level STG are captured). However, the method of FIG. 1 captures only one test image having a predetermined gray level (i.e., the first target gray level FTG) for each color (i.e., RGB) (e.g., captures only a red test image having the first target gray level FTG, a green test image having the first target gray level FTG, and a blue test image having the first target gray level FTG) by taking into consideration that the red pixel 111R, the green pixel 111G, and the blue pixel 111B included in each of the first to $k^{th}$ display areas DP1, . . . , and DPk have similar luminance characteristics according to the input voltage, so that the first to $k^{th}$ RGB gamma values to be applied to the first to $k^{th}$ display areas DP1, . . . , and DPk may be set. As described above, the method of FIG. 1, when calculating the first to $k^{th}$ RGB gamma values to be applied to the first to $k^{th}$ display areas DP1, . . . , and DPk of the display panel 100, may display the first color test image having the first target gray level FTG on the display panel 100 and then measure the first luminance value implemented by the at least one first color pixel included in the $j^{th}$ display area DPj by using the luminance measurement device, may display the second color test image having the first target gray level FTG on the display panel 100 and then measure the second luminance value implemented by the at least one second color pixel included in the $j^{th}$ display area DPj by using the luminance measurement device, may derive the estimated driving current EDC flowing the second color pixel at the first target gray level FTG based on the RGB gray level-driving current curves RCV, GCV, and BCV, may derive the second target gray level STG when the estimated driving current EDC flows in the first color pixel based on the RGB gray level-driving current curves RCV, GCV, and BCV, and may calculate the target gamma value to be applied to the first color pixel included in the $j^{th}$ display area DPj based on the first target gray level FTG, the second target gray level STG, the first luminance value implemented at the first target gray level FTG by the at least one first color pixel included in the $j^{th}$ display area DPj, and the second luminance value implemented at the first target gray level FTG by the at least one second color pixel included in the $j^{th}$ display area DPj, so that the first to $k^{th}$ RGB gamma values to be applied to the first to $k^{th}$ display areas DP1, . . . , and DPk of the display panel 100 may be calculated by using the RGB gray level-driving current curves RCV, GCV, and BCV even when only one test image is captured for each color (i.e., RGB). Accordingly, the method of FIG. 1 may solve a conventional problem that a manufacturing process of an organic light emitting diode display device becomes longer in order to set the RGB gamma values to be different from each other for each display area DP1, . . . , and DPk of the display panel 100, so that the method of FIG. 1 may be easily applied to mass production of the organic light emitting diode display device.

Figure 5:
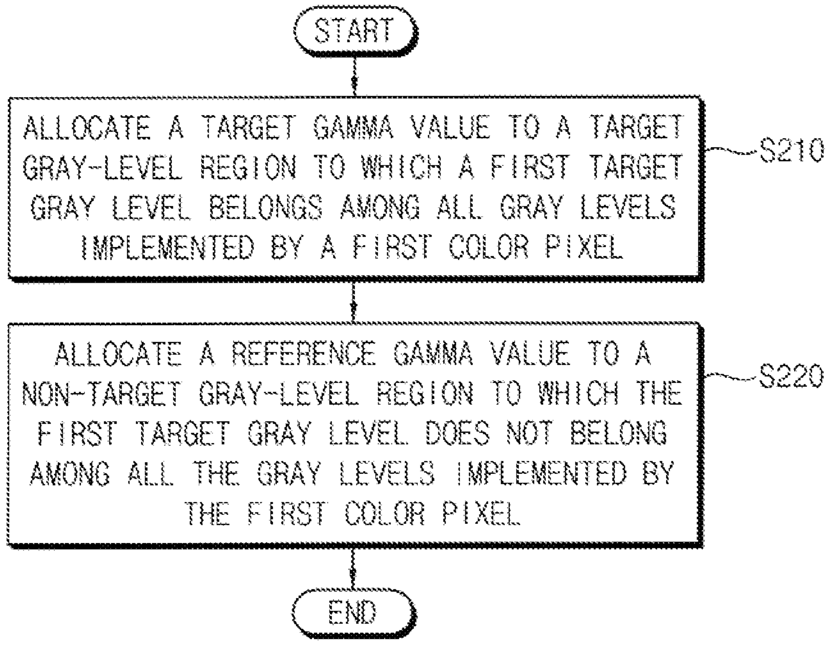
FIG. 5 is a flowchart illustrating an example in which a gamma value is allocated to a target gray-level region and a non-target gray-level region by the method of FIG. 1 according to an embodiment of the present inventive concept.
Figure 6:
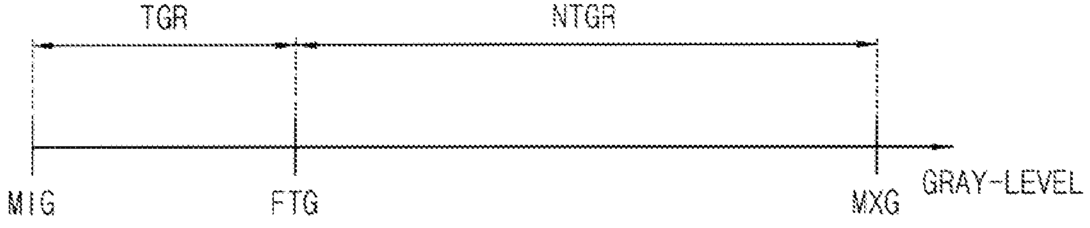
FIG. 6 is a diagram for describing an example in which a gamma value is allocated to a target gray-level region and a non-target gray-level region by the method of FIG. 1 according to an embodiment of the present inventive concept.

FIG. 5 is a flowchart illustrating an example in which a gamma value is allocated to a target gray-level region and a non-target gray-level region by the method of FIG. 1, and FIG. 6 is a diagram for describing an example in which a gamma value is allocated to a target gray-level region and a non-target gray-level region by the method of FIG. 1.

Referring to FIGS. 5 and 6, the method of FIG. 1 may allocate the gamma value to a target gray-level region TGR and a non-target gray-level region NTGR after the steps S110, S120, S130, S140, and S150 are performed. For example, the method of FIG. 1 may allocate the target gamma value to be applied to the first color pixel included in the $j^{th}$ display area DPj to the target gray-level region TGR to which the first target gray level FTG belongs among all gray levels MIG, . . . , and MXG implemented by the first color pixel included in the $j^{th}$ display area DPj (S210), and may allocate the reference gamma value of the display panel 100 to the non-target gray-level region NTGR to which the first target gray level FTG does not belong among all the gray levels MIG, . . . , and MXG implemented by the first color pixel included in the $j^{th}$ display area DPj (S220). The phrase "all gray levels MIG, . . . , and MXG implemented by a color pixel" may mean that a color pixel may take on one gray level in a range between the minimum gray level MIG and the maximum gray level MXG. For an 8-bit-deep image, the number of all gray levels which a color pixel may take is 256 with the minimum gray level MIG of 0 and the maximum gray level MXG of 255. The target gray-level region TGR may be a low gray-level region having a gray level less than or equal to the first target gray level FTG among all the gray levels MIG, . . . , and MXG implemented by the first color pixel included in the $j^{th}$ display area DPj. For example, the target gray-level region TGR may be a gray-level region having a gray level that is greater than or equal to a minimum gray level MIG and less than or equal to the first target gray level FTG. The non-target gray-level region NTGR may be a high gray-level region having a gray level greater than the first target gray level FTG among all the gray levels MIG, . . . , and MXG implemented by the first color pixel included in the $j^{th}$ display area DPj. For example, the non-target gray-level region NTGR may be a gray-level region having a gray level that is greater than the first target gray level FTG and less than or equal to a maximum gray level MXG. However, this embodiment is proposed for illustrative purposes only, so the target gray-level region TGR and the non-target gray-level region NTGR may be set in various ways. In general, when the same RGB gamma value is applied to all the display areas DP1, and DPk of the display panel 100, the display areas may have a large luminance deviation in a low gray-level image, whereas the display areas may have a luminance deviation that is not large in a high gray-level image. Accordingly, the method of FIG. 1 may allocate the target gamma values (i.e., the RGB gamma values) calculated through the steps S110, S120, S130, S140, and S150 to only the target gray-level region TGR (e.g., the low gray-level region) among all the gray levels implemented by the pixel, and may allocate the reference gamma value (e.g., 2.2) of the display panel 100 to the non-target gray-level region NTGR (e.g., the high gray-level region) among all the gray levels implemented by the pixel.

Figure 7:
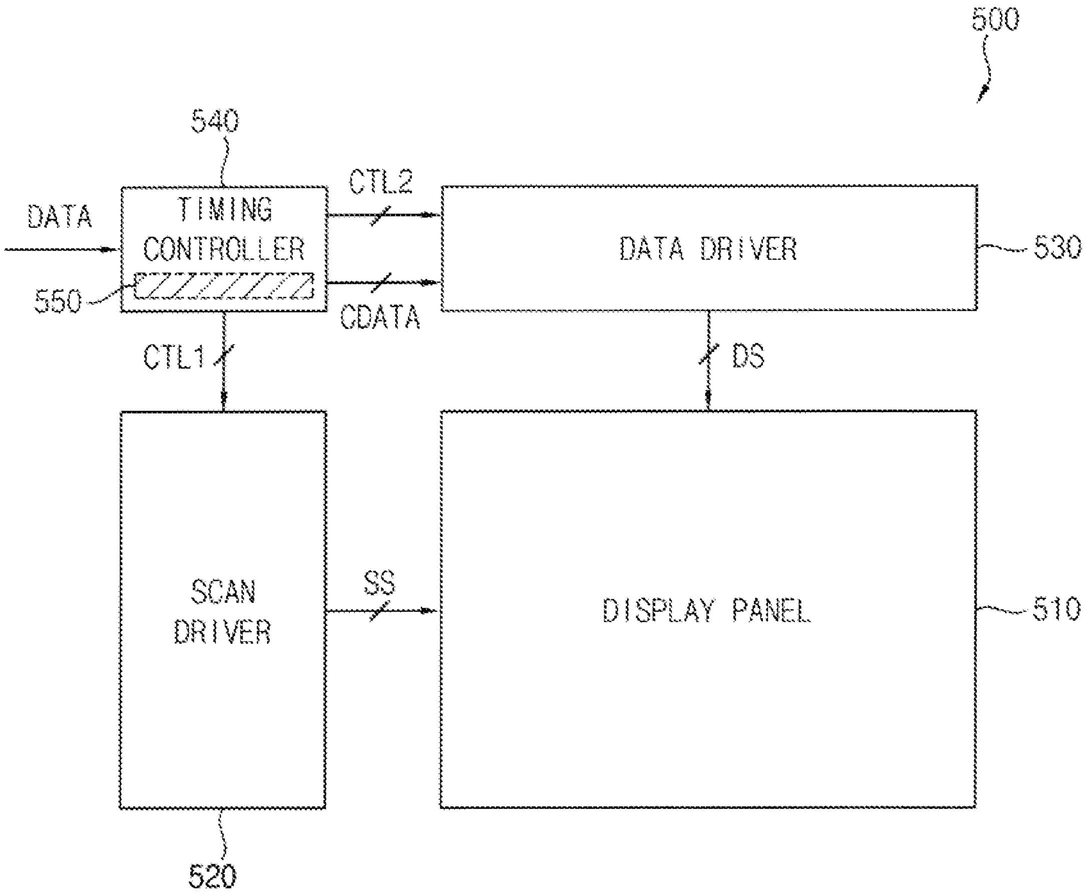
FIG. 7 is a block diagram illustrating an organic light emitting diode display device according to an embodiment of the present inventive concept.
Figure 8:
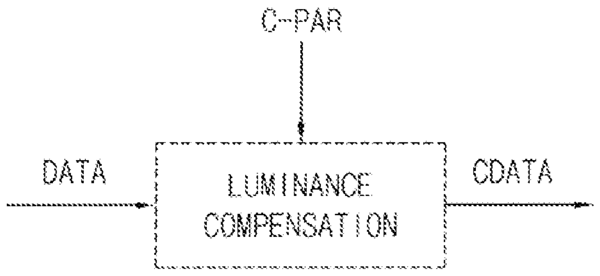
FIG. 8 is a diagram for describing luminance compensation performed by the organic light emitting diode display device of FIG. 7 according to an embodiment of the present inventive concept.

FIG. 7 is a block diagram illustrating an organic light emitting diode display device according to embodiments, and FIG. 8 is a diagram for describing luminance compensation performed by the organic light emitting diode display device of FIG. 7.

Referring to FIGS. 7 and 8, the organic light emitting diode display device 500 may include a display panel 510, a scan driver 520, a data driver 530, a timing controller 540, and a memory device 550. In an embodiment, as illustrated in FIG. 7, the memory device 550 is located within the timing controller 540. In another embodiment, the memory device 550 may be located outside the timing controller 540.

The display panel 510 may include a plurality of pixels. The pixels may include a red pixel, a green pixel, and a blue pixel. At least one red pixel, at least one green pixel, and at least one blue pixel may constitute one unit pixel. In an embodiment, the unit pixel has an RGB stripe structure. In another embodiment, the unit pixel may have a pentile structure. The display panel 510 may be connected to the scan driver 520 through scan lines, and may be connected to the data driver 530 through data lines. The scan driver 520 may provide a scan signal SS to the display panel 510 through the scan lines. A scan driving circuit 522 may provide the scan signal SS to the pixels. The data driver 530 may provide a data signal DS (or a data voltage) to the display panel 510 through the data lines. The data driver 530 may provide the data signal DS to the pixels. The timing controller 540 may control the scan driver 520 and the data driver 530 by generating a plurality of control signals CTL1 and CTL2 and providing the control signals CTL1 and CTL2 to the scan driver 520 and the data driver 530, respectively. The memory device 550 may store a display area-specific compensation parameter C-PAR generated based on first to $k^{th}$ RGB gamma values applied to first to $k^{th}$ display areas of the display panel 510 when an organic light emitting diode display device 500 is manufactured. In an embodiment, each of the first to $k^{th}$ display areas of the display panel 510 includes one unit pixel including at least one red pixel, at least one green pixel, and at least one blue pixel. In another embodiment, each of the first to $k^{th}$ display areas of the display panel 510 may include a plurality of unit pixels, in which each of the unit pixels includes at least one red pixel, at least one green pixel, and at least one blue pixel. As shown in FIG. 8, the timing controller 540 may perform luminance compensation (i.e., denoted by LUMINANCE COMPENSATION) on input image data DATA generated from an external component (e.g., a graphic processing unit (GPU), etc.) based on the display area-specific compensation parameter C-PAR stored in the memory device 550 so as to generate output image data CDATA. The data driver 530 may convert the output image data CDATA into the data signal DS and provide the data signal DS to the display panel 510. In some embodiments, the organic light emitting diode display device 500 may further include an emission control driver which provides an emission control signal to the display panel 510.

As described above, the display area-specific compensation parameter C-PAR for performing the luminance compensation (i.e., denoted by LUMINANCE COMPENSATION) may be generated, when the organic light emitting diode display device 500 is manufactured, based on the first to $k^{th}$ RGB gamma values to be applied to the first to $k^{th}$ display areas of the display panel 510. The first to $k^{th}$ RGB gamma values to be applied to the first to $k^{th}$ display areas of the display panel 510 may be calculated by capturing only one test image having a predetermined gray level for each color (e.g., capturing only a red test image having the predetermined gray level, a green test image having the predetermined gray level, and a blue test image having the predetermined gray level). The red pixel, the green pixel, and the blue pixel included in each of the first to $k^{th}$ display areas of the display panel 510 may have similar luminance characteristics according to an input voltage. For example, the first to $k^{th}$ RGB gamma values to be applied to the first to $k^{th}$ display areas of the display panel 510 may be calculated by displaying a first color test image having a first target gray level on the display panel 510 and measuring a first luminance value implemented by at least one first color pixel included in a $j^{th}$ display area by using a luminance measurement device, displaying a second color test image having the first target gray level on the display panel 510 and measuring a second luminance value implemented by at least one second color pixel included in the $j^{th}$ display area by using the luminance measurement device, deriving an estimated driving current flowing the second color pixel at the first target gray level based on RGB gray level-driving current curves, deriving a second target gray level when the estimated driving current flows in the first color pixel based on the RGB gray level-driving current curves, and calculating a target gamma value to be applied to the first color pixel included in the $j^{th}$ display area based on the first target gray level, the second target gray level, the first luminance value implemented at the first target gray level by the at least one first color pixel included in the $j^{th}$ display area, and the second luminance value implemented at the first target gray level by the at least one second color pixel included in the $j^{th}$ display area. The RGB gray level-driving current curves may be predetermined during a design stage of the display panel 510 according to characteristics of a driving transistor and characteristics of an organic light emitting diode that are to be formed in the first color pixel and the second color pixel. In an embodiment, the target gamma value to be applied to the first color pixel included in the $j^{th}$ display area is calculated by Formula 1 as described above. With Formula 1, the target gamma value to be applied to the first color pixel included in the $j^{th}$ display area may be calculated independently from a reference display area gamma value that is set to a reference display area (e.g., a center display area). In another embodiment, the target gamma value to be applied to the first color pixel included in the $j^{th}$ display area may be calculated by Formula 2 as described above. With Formula 2, the target gamma value to be applied to the first color pixel included in the $j^{th}$ display area may be calculated by reflecting the reference display area gamma value that is set to the reference display area (e.g., the center display area). Since these operations are described above, duplicated description related thereto will not be repeated.

Figure 9:
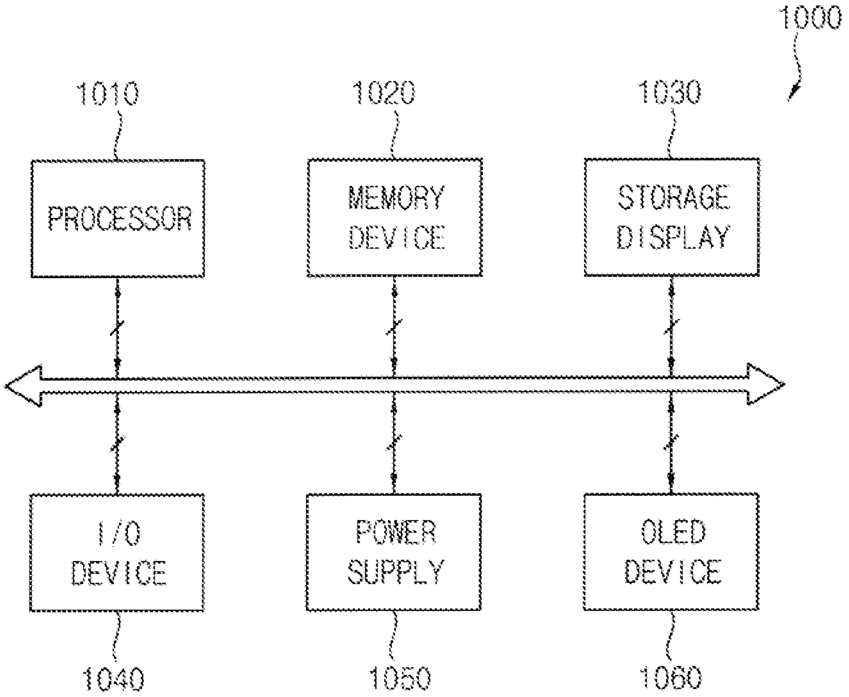
FIG. 9 is a block diagram illustrating an electronic device according to an embodiment of the present inventive concept.
Figure 10:
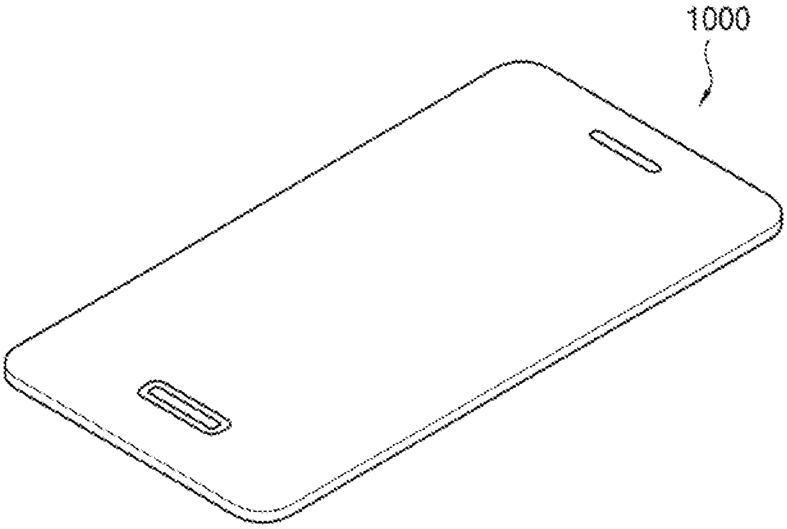
FIG. 10 is a diagram illustrating an example in which the electronic device of FIG. 9 is implemented as a smart phone according to an embodiment of the present inventive concept.

FIG. 9 is a block diagram illustrating an electronic device according to embodiments, and FIG. 10 is a diagram illustrating an example in which the electronic device of FIG. 9 is implemented as a smart phone.

Referring to FIGS. 9 and 10, the electronic device 1000 may include a processor 1010, a memory device 1020, a storage device 1030, an input/output (I/O) device 1040, a power supply 1050, and an organic light emitting diode display (OLED) device 1060. The organic light emitting diode display device 1060 may be the display device of FIG. 7. The electronic device 1000 may further include a plurality of ports for communicating with a video card, a sound card, a memory card, a universal serial bus (USB) device, other electronic devices, etc. In an embodiment, as illustrated in FIG. 10, the electronic device 1000 is implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions. The processor 1010 may be a micro processor, a central processing unit (CPU), an application processor (AP), etc. The processor 1010 may be coupled to other components via an address bus, a control bus, a data bus, etc. The processor 1010 may be coupled to an extended bus such as a peripheral component interconnection (PCI) bus. The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like, and at least one volatile memory device such as a dynamic random access memory (DRAM) device, a static random access memory (SRAM) device, a mobile DRAM device, and the like. The storage device 1030 may include a solid state drive (SSD) device, a hard disk drive (HDD) device, a CD-ROM device, etc. The I/O device 1040 may include an input device such as a keyboard, a keypad, a mouse device, a touch-pad, a touch-screen, and the like, and an output device such as a printer, a speaker, and the like. In some embodiments, the organic light emitting diode display device 1060 may be included in the I/O device 1040. The power supply 1050 may provide power for operations of the electronic device 1000. The organic light emitting diode display device 1060 may be coupled to other components via the buses or other communication links.

The organic light emitting diode display device 1060 may display an image corresponding to visual information of the electronic device 1000. The organic light emitting diode display device 1060 may enhance an image quality by performing luminance compensation. The organic light emitting diode display device 1060 may include a display panel including a plurality of pixels, a scan driver that provides a scan signal to the display panel, a data driver that provides a data signal to the display panel, a timing controller that controls the scan driver and the data driver, a memory device that stores a display area-specific compensation parameter, and the like. In some embodiments, the organic light emitting diode display device 1060 may further include an emission control driver that provides an emission control signal to the display panel. The timing controller may perform the luminance compensation on the input image data based on the display area-specific compensation parameter stored in the memory device to generate the output image data. For this operation, when the organic light emitting diode display device 1060 is manufactured, the display area-specific compensation parameter may be generated based on the first to $k^{th}$ RGB gamma values applied to the first to $k^{th}$ display areas of the display panel. The first to $k^{th}$ RGB gamma values to be applied to the first to $k^{th}$ display areas of the display panel may be calculated by displaying the first color test image having the first target gray level on the display panel and measuring the first luminance value implemented by the at least one first color pixel included in the $j^{th}$ display area by using the luminance measurement device, displaying the second color test image having the first target gray level on the display panel and measuring the second luminance value implemented by the at least one second color pixel included in the $j^{th}$ display area by using the luminance measurement device, deriving the estimated driving current flowing the second color pixel at the first target gray level based on the RGB gray level-driving current curves, deriving the second target gray level when the estimated driving current flows in the first color pixel based on the RGB gray level-driving current curves, and calculating the target gamma value to be applied to the first color pixel included in the $j^{th}$ display area based on the first target gray level, the second target gray level, the first luminance value implemented at the first target gray level by the at least one first color pixel included in the $j^{th}$ display area, and the second luminance value implemented at the first target gray level by the at least one second color pixel included in the $j^{th}$ display area. Since these operations are described above, duplicated description related thereto will not be repeated.

The present inventive concept may be applied to an organic light emitting diode display device and an electronic device including the organic light emitting diode display device. For example, the present inventive concept may be applied to a smart phone, a cellular phone, a video phone, a smart pad, a smart watch, a tablet PC, a car navigation system, a television, a computer monitor, a laptop, a head mounted display device, an MP3 player, and the like.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A method of calculating a gamma value for a display panel having first to $k^{th}$ display areas, wherein the method calculates first to $k^{th}$ RGB gamma values, where k is an integer greater than or equal to 2, to be applied to the first to $k^{th}$ display areas, the method comprising:

displaying a first color test image having a first target gray level using two or more first color pixels included in a $j^{th}$ display area on the display panel, and then measuring a first average luminance value of a first light having only a first color emitted from the two or more first color pixels included in the $j^{th}$ display area, where j is an integer between 1 and k, by using a luminance measurement device;

displaying a second color test image having the first target gray level using two or more second color pixels included in the $j^{th}$ display area on the display panel, and then measuring a second average luminance value of a second light having only a second color different from the first color emitted from the two or more second color pixels included in the $j^{th}$ display area by using the luminance measurement device, wherein the displaying of the second color test image and the measuring of the second average luminance value is performed after the displaying of the first color test image and the measuring of the first average luminance value;

obtaining an estimated driving current flowing the second color pixel at the first target gray level from a second color gray level-driving current curve of RGB gray level-driving current curves, wherein the RGB gray level-driving current curves include a first color gray level-driving current curve which maps a gray level of the first color pixel to an estimated driving current flowing the first color pixel, and the second color gray level-driving current curve which maps a gray level of the second color pixel to an estimated driving current flowing the second color pixel;

obtaining a second target gray level of the first color pixel at the estimated driving current of the second color pixel from the first color gray level-driving current curve of the RGB gray level-driving current curves; and calculating a target gamma value to be applied to the first color pixel included in the $j^{th}$ display area based on the first target gray level, the second target gray level, the first average luminance value, and the second average luminance value.

2. The method of claim 1, wherein the RGB gray level-driving current curves are predetermined during a design stage of the display panel according to characteristics of a driving transistor and characteristics of an organic light emitting diode that are to be formed in the two or more first color pixels and the second two or more color pixel.

3. The method of claim 1, wherein each of the two or more first color pixels is a red pixel, and each of the two or more second color pixels is a green pixel or a blue pixel.

4. The method of claim 1, wherein each of the two or more first color pixels is a green pixel, and each of the two or more second color pixels is a red pixel or a blue pixel.

5. The method of claim 1, wherein each of the two or more first color pixels is a blue pixel, and each of the two or more second color pixels is a red pixel or a green pixel.

6. The method of claim 1, further comprising:

allocating the target gamma value to a low gray-level region having a gray level which is less than or equal to the first target gray level; and allocating a reference gamma value of the display panel to a high gray-level region having a gray level which is greater than the first target gray level.

7. The method of claim 6, wherein the reference gamma value is 2.2.

8. The method of claim 1, wherein the RGB gray level-driving current curves further include a third color gray level-driving current curve which maps a gray level of a third color pixel in the $j^{th}$ display area to an estimated driving current flowing the third color pixel.

9. The method of claim 1, wherein the first average luminance value is an arithmetic average luminance value of the two or more first color pixels included in the $j^{th}$ display area, and wherein the second average luminance value is an arithmetic average luminance value of the two or more second color pixels included in the $j^{th}$ display area.

10. The method of claim 1, wherein the first average luminance value is a weighted average luminance value of the two or more first pixels included in the $j^{th}$ display area, and wherein the second average luminance value is a weighted average luminance value of the two or more second pixels included in the $j^{th}$ display area.

11. The method of claim 1, wherein the $j^{th}$ display area includes two or more unit pixels each including at least one red pixel, at least one green pixel, and at least one blue pixel.

12. The method of claim 1, wherein the target gamma value is calculated independently from a reference display area gamma value that is set to a reference display area.

13. The method of claim 12, wherein the target gamma value is calculated by the following formula:

$$TGV(\gamma) = \frac{\log(SLV) - \log(FLV)}{\log(STG) - \log(FTG)},$$

where TGV(γ) denotes the target gamma value, FLV denotes the first luminance value, SLV denotes the second luminance value, FTG denotes the first target gray level, and STG denotes the second target gray level.

14. The method of claim 1, wherein the target gamma value is calculated by reflecting a reference display area gamma value that is set to a reference display area.

15. The method of claim 14, wherein the target gamma value is calculated by the following formula:

$$TGV(\gamma) = \frac{\log(C \times SLV) - \log(FLV)}{\log(STG) - \log(FTG)},$$

where TGV(γ) denotes the target gamma value, FLV denotes the first luminance value, SLV denotes the second luminance value, FTG denotes the first target gray level, STG denotes the second target gray level, and C denotes a constant for reflecting the reference display area gamma value.

16. The method of claim 15, wherein the reference display area is a center display area of the display panel among the first to $k^{th}$ display areas.

17. The method of claim 16, wherein the reference display area gamma value is a reference gamma value of the display panel.

18. The method of claim 17, wherein the reference display area gamma value is 2.2.

* * * * *